(12) United States Patent
Schutt

(10) Patent No.: US 10,889,186 B2
(45) Date of Patent: Jan. 12, 2021

(54) SUSPENSION MOTION CHARGING ARRANGEMENT

(71) Applicant: SAF-HOLLAND, Inc., Muskegon, MI (US)

(72) Inventor: Randy L. Schutt, Holland, MI (US)

(73) Assignee: SAF-HOLLAND, Inc., Muskegon, MI (US)

( * ) Notice: Subject to any disclaimer, the term of this patent is extended or adjusted under 35 U.S.C. 154(b) by 191 days.

(21) Appl. No.: 16/246,053

(22) Filed: Jan. 11, 2019

(65) Prior Publication Data

US 2019/0217702 A1    Jul. 18, 2019

Related U.S. Application Data

(60) Provisional application No. 62/617,805, filed on Jan. 16, 2018.

(51) Int. Cl.
| | |
|---|---|
| *B60K 25/10* | (2006.01) |
| *B60L 50/10* | (2019.01) |
| *H02J 50/10* | (2016.01) |
| *H02J 7/02* | (2016.01) |
| *B60L 53/55* | (2019.01) |
| *H02J 7/00* | (2006.01) |

(52) U.S. Cl.
CPC ............. *B60K 25/10* (2013.01); *B60L 50/10* (2019.02); *B60L 53/55* (2019.02); *H02J 7/00* (2013.01); *H02J 7/025* (2013.01); *H02J 50/10* (2016.02); *B60K 2025/103* (2013.01); *B60Y 2200/148* (2013.01)

(58) Field of Classification Search
CPC ....................................................... H02J 50/10

USPC ........................................................ 320/104
See application file for complete search history.

(56) References Cited

U.S. PATENT DOCUMENTS

| | | |
|---|---|---|
| 4,032,829 A | 6/1977 | Schenavar |
| 4,500,827 A | 2/1985 | Merritt et al. |
| 4,900,054 A | 2/1990 | Kessler |
| 5,036,934 A | 8/1991 | Nishina et al. |
| 5,390,949 A | 2/1995 | Naganathan et al. |
| 5,570,286 A | 10/1996 | Margolis et al. |
| 5,578,877 A | 11/1996 | Tiemann |
| 5,590,734 A | 1/1997 | Caires |
| 6,111,375 A | 8/2000 | Zenobi |
| 6,841,970 B2 | 1/2005 | Zabramny |
| 7,261,171 B2 | 8/2007 | De La Torre et al. |

(Continued)

*Primary Examiner* — Edward Tso
*Assistant Examiner* — Ahmed H Omar
(74) *Attorney, Agent, or Firm* — Price Heneveld LLP

(57) ABSTRACT

A vehicle suspension arrangement includes a mounting member, a trailing arm pivotably coupled to the mounting member, an axle assembly coupled to the trailing arm moveable in a vertical direction, an air spring arrangement biasing the trailing arm from the vehicle frame assembly, and a charging arrangement having a first portion operably coupled with the second end of the trailing arm such the first portion is fixed for vertical movement with the trailing arm, and a second portion that is operably coupled with the vehicle frame assembly such that the second portion is fixed for vertical movement with the vehicle frame assembly, wherein the charging arrangement is configured to generate an electrical charge when the first portion of the charging arrangement moves relative to the second portion of the charging arrangement.

23 Claims, 2 Drawing Sheets

(56) References Cited

U.S. PATENT DOCUMENTS

| | | |
|---|---|---|
| 7,547,980 B2 | 6/2009 | Harrison |
| 8,143,766 B2 | 3/2012 | Namuduri et al. |
| 8,191,669 B2 | 6/2012 | Verbrugge |
| 8,336,659 B2 | 12/2012 | Pintos Pintos |
| 8,513,824 B2 | 8/2013 | Sohn |
| 8,723,344 B1 | 5/2014 | Dierickx |
| 9,561,701 B2 | 2/2017 | Johnson |
| 2007/0089924 A1 | 4/2007 | De La Torre et al. |
| 2008/0277939 A1 | 11/2008 | Richardson et al. |
| 2008/0284258 A1 | 11/2008 | Spratte et al. |
| 2009/0106990 A1 | 4/2009 | Harrill et al. |
| 2010/0006362 A1 | 1/2010 | Armstrong |
| 2010/0213397 A1 | 8/2010 | Trudeau et al. |
| 2010/0283259 A1 | 11/2010 | Hung |
| 2010/0327600 A1* | 12/2010 | Koelsch ............ B60L 8/003 290/1 A |
| 2011/0079969 A1 | 4/2011 | Amlie et al. |
| 2014/0251705 A1 | 9/2014 | Salzmann et al. |
| 2016/0375739 A1 | 12/2016 | Johnson |

\* cited by examiner

SUSPENSION MOTION CHARGING ARRANGEMENT

CROSS-REFERENCE TO RELATED APPLICATIONS

This application claims the benefit of U.S. Provisional Patent Application No. 62/617,805, filed on Jan. 16, 2018, entitled "SUSPENSION MOTION CHARGING ARRANGEMENT," the entire disclosure of which is incorporated herein by reference.

BACKGROUND

The embodiments as shown and described herein relate to a vehicle suspension arrangement, and in particular to a vehicle suspension arrangement for heavy-duty, commercial-type vehicles such as semi-trailers that include a charging arrangement that utilizes the relative vertical motion of a suspension system supporting the vehicle.

BRIEF SUMMARY

An embodiment includes a vehicle suspension arrangement that includes mounting member configured to mount to a vehicle frame assembly, trailing arm having a first end pivotably coupled to the mounting member and a second end, an axle assembly coupled to the second end of the trailing arm such that the second end of the trailing arm travels in a vertical direction between a raised position and a lowered position as the axle assembly moves in a vertical direction, and an air spring arrangement biasing the second end of the trailing arm from the vehicle frame assembly. The vehicle suspension arrangement further includes a charging arrangement having a first portion operably coupled with the second end of the trailing arm such the first portion is fixed for vertical movement with the second end of the trailing arm, and a second portion that is operably coupled with the vehicle frame assembly such that the second portion is fixed for vertical movement with the vehicle frame assembly, wherein the charging arrangement is configured to generate an electrical charge when the first portion of the charging arrangement moves relative to the second portion of the charging arrangement.

Another embodiment includes a vehicle suspension arrangement that includes a vehicle frame assembly, an axle assembly operably coupled to the vehicle frame assembly and moveable in a vertical direction between a lowered position and a raised position, a charging arrangement having a first portion including one of a magnet and a wire coil operably coupled with the vehicle frame assembly such the first portion is fixed for vertical movement with the vehicle frame assembly, and a second portion including the other of the magnet and the wire coil such that the second portion is fixed for vertical movement with the axle assembly, wherein the charging arrangement is configured to generate an electrical charge as the magnet moves with respect to the wire coil, and a sensor arrangement configured to receive the electrical charge from the charging arrangement and configured to sense at least one vehicle parameter.

The principal objects of the embodiments as shown and described herein are to provide a durable electrical charging arrangement that utilizes the relative vertical motion of a suspension arrangement supporting the vehicle to create an electrical charge, where the electrical charge may be stored so as to power vehicle sensor arrangements configured to sense vehicle parameters, and which may then be communicated with a remote, centrally located vehicle fleet control location, and communicate the vehicle parameters with the remote location regardless of whether the vehicle, namely a trailer, is coupled with or uncoupled from an associated towing vehicle. The embodiments as shown and described herein are relatively uncomplicated in design, may be easily retrofitted to existing suspension arrangements, are capable of a long operating life, and are particularly well adapted for the proposed and intended uses.

These and other features, advantages, and objects of the embodiments shown and described herein will be further understood and appreciated by those skilled in the art by reference to the following specification, claims, and appended drawings.

DETAILED DESCRIPTION OF THE PREFERRED EMBODIMENTS

Figure 1:
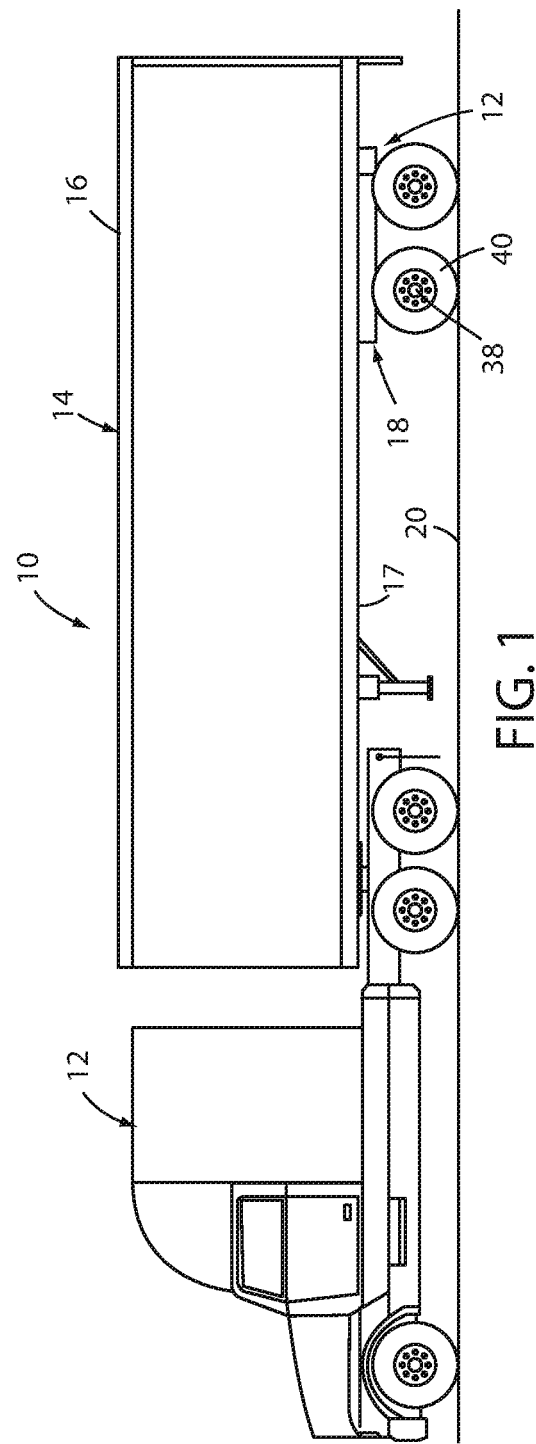
FIG. 1 is a schematic view of a semi-truck or tractor and heavy-duty, commercial-type trailer combination that includes a suspension motion charging arrangement.
Figure 2:
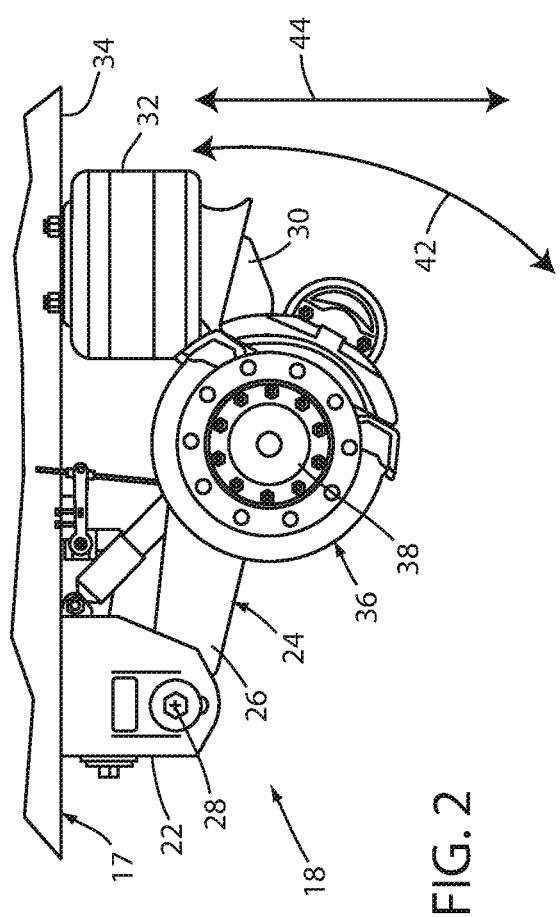
FIG. 2 is a side elevational view of a suspension assembly.

For purposes of description herein, the terms "upper," "lower," "right," "left," "rear," "front," "vertical," "horizontal," and the embodiments thereof shall relate to the embodiment as oriented in FIGS. 1 and 2. However, it is to be understood that the various embodiments as shown and described herein may assume various alternative orientations, except where expressly specified to the contrary. It is also to be understood that the specific devices and processes illustrated in the attached drawings, and described in the following specification are simply exemplary embodiments of the concepts defined in the appended claims. Hence, specific dimensions and other characteristics relating to the embodiments disclosed herein are not to be considered as limiting, unless the claims expressly state otherwise.

The reference numeral 10 (FIG. 1) generally designates a truck and trailer combination that includes a semi-truck or tractor 12 and a heavy-duty, commercial-type trailer 14. The trailer 14 includes a trailer body 16, a trailer frame assembly 17 and a suspension assembly 18 configured to support the trailer body 16 and the frame assembly 17 above a ground surface 20.

As best illustrated in FIG. 2, the suspension assembly 18 includes a mounting bracket 22, a trailing arm 24 having a first end 26 pivotably coupled to the mounting bracket 22 for pivoting about a pivot point 28, and a second end 30. The suspension assembly 18 further includes an air spring 32 configured to bias the second end 30 of the trailing arm 24 from a frame member 34 of the frame assembly 17. The suspension assembly 18 still further includes an axle assembly 36 that includes an axle member 38 coupled to the trailing arm 24 along a length of the trailing arm 24 and supporting an associated tire 40 that rides along the ground surface 20. In operation, the trailing arm 24 pivots about the pivot point 28 as the associated tires 40 ride along the ground or road surface 20, such that the trailing arm 24 travels in the directions 42. It is noted that during normal operation, the trailing arms 24 of the suspension assembly 18 move in the directions 34 to an extent such that the second or distal end 30 of each of the trailing arms 24 moves as much as two inches in each of the vertical directions 44, for a total of four inches in the vertical directions 44. It is noted that this motion of the trailing arm 24 or overall suspension assembly 18 may be referred to as "jounce."

Figure 3:
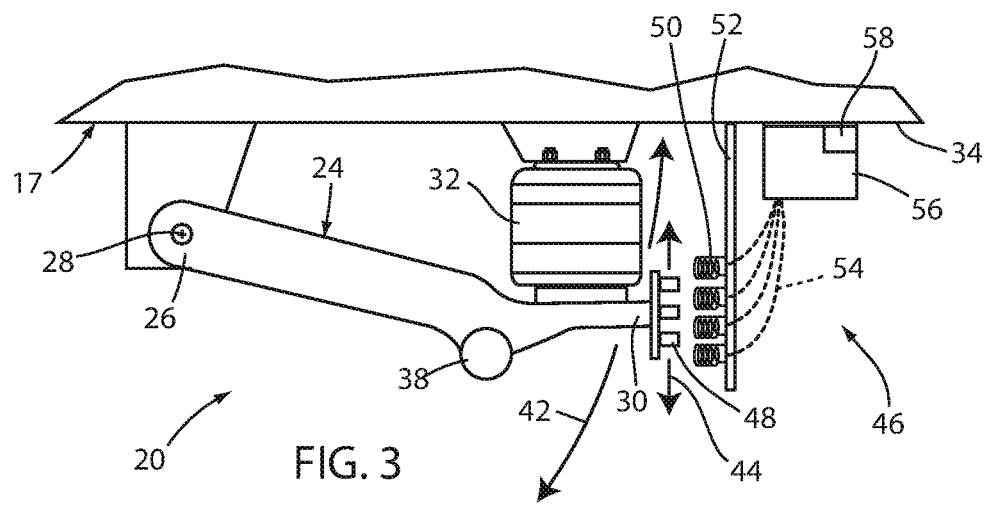
FIG. 3 is a side elevational schematic view of the suspension assembly including a first embodiment of the charging arrangement.
Figure 4:
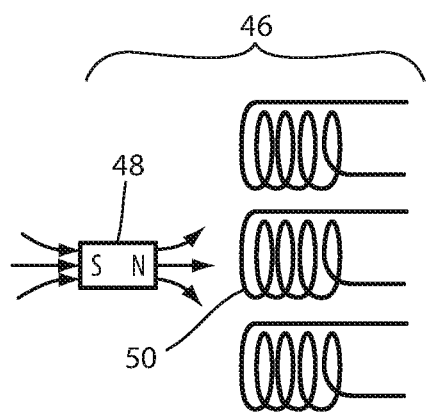
FIG. 4 is a schematic view of the first embodiment of the charging arrangement as shown in FIG. 3.

As best illustrated in FIGS. 3 and 4, the suspension arrangement 20 further includes a charging arrangement 46. In the illustrated example, the charging arrangement 46 comprises an electromagnetic coil arrangement that includes a plurality of magnets 48 fixedly secured to the second end 30 of the trailing arm 24, and a plurality of wire coils 50 fixedly secured to a support member 52 that is fixed with the frame member 34 for movement in a vertical direction. In operation, movement of the magnets 36 in the vertical direction 44 due to movement of the second end 30 of the trailing arm 24 in the directions 42 moves the magnets 48 with respect to the plurality of wire coils 50, thereby creating an electrical current within the coils 50. Each of the coils 50 are electrically coupled via a plurality of corresponding lead wires 54 to an energy storage arrangement 56, such as a battery, a capacitor, and the like. Energy stored within the energy storage arrangement 56 may be utilized while the trailer 14 is either coupled or uncoupled from the tractor 12, and may be used to power remote sensors located proximate components of the suspension assembly 18, such as temperature sensors, component wear sensors, proximity sensors, weight sensors, pressure sensors, location sensors such as GPS devices, and the like, as well as communication devices configured to communicate operational parameters of the vehicle to either the operator of the vehicle assembly 10 or to remote locations, such as remote central dispatch and fleet control centers, where the vehicle parameters include things such as the speed of the vehicle, the location of the vehicle, the weight of the vehicle, the temperature of the vehicle, information regarding wear of associated components of the suspension assembly, tire pressure readings, energy storage levels, and the like.

While the present embodiment includes an electromagnetic coil arrangement, other charging arrangements configured to create an electrical current in response to the relative vertical motion of the trailing arm or other suspension components relative to the supporting frame assembly 17 may also be utilized.

Figure 6:
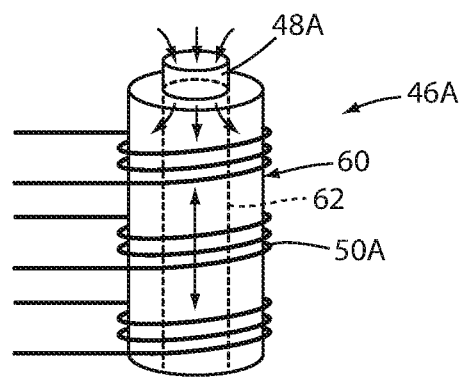
FIG. 6 is a perspective view of the second embodiment of the charging arrangement.
Figure 5:
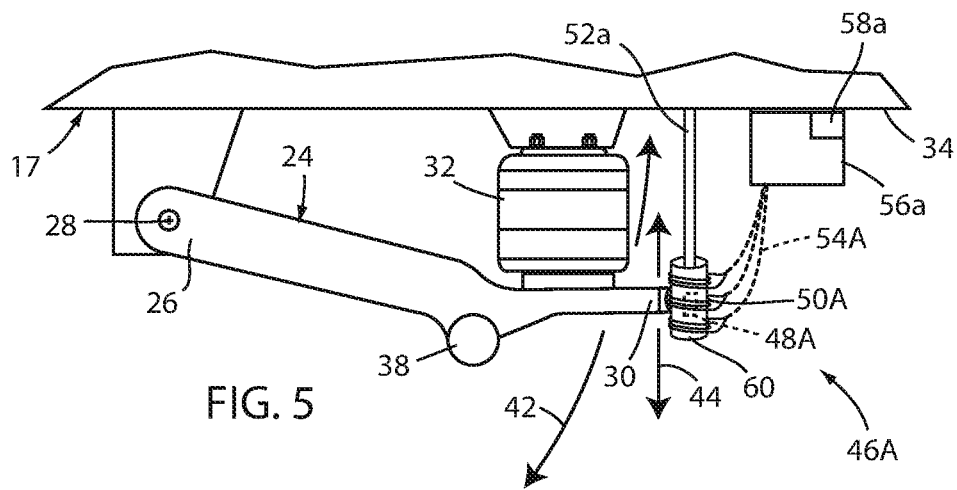
FIG. 5 is a side elevational schematic view of the suspension assembly with a second embodiment of the charging arrangement.

As best illustrated in FIGS. 5 and 6, an alternative embodiment of the charging arrangement 46a includes an electromagnetic coil arrangement that includes a tube member 60 fixed to the second end 30 of the trailing arm 24. The reference 46a generally designates this additional embodiment. Since the charging arrangement 46a is similar to the previously described charging arrangement 46, similar parts appearing in FIGS. 2-4 and FIGS. 5 and 6 are respectively represented by the same, corresponding reference numeral, except for the suffix "a" in the numerals of the latter. In the illustrated example, the tube member 60 includes a longitudinally extending bore 62. The charging arrangement 46a further includes a plurality of wire coils 50a wrapped about and spaced along a length of the tube member 60. A plurality of magnets 48a are fixed to the support member 52a that is fixed for vertical movement with the frame member 34 such that the wire coils 50 move in the vertical direction 44 relative to the magnets 48a as the tires 40 abut an uneven ground surface 20 and move the second end 30 of the trailing arm 24 in the directions 42. This relative movement between the magnets 48a and the wire coils 50a create an electric current within the coils. The electrical output created by the charging arrangement 46a may be utilized in a similar manner to that as discussed above with respect to the charging arrangement 46.

The embodiments of the suspension assembly described herein provide a durable electrical charging arrangement that utilizes the relative vertical motion of a suspension arrangement supporting the vehicle to create an electrical charge, where the electrical charge may be stored so as to power vehicle sensor arrangements configured to sense vehicle parameters, and which may then be communicated with a remote, centrally located vehicle fleet control location, and communicate the vehicle parameters with the remote location regardless of whether the vehicle, namely a trailer, is coupled with or uncoupled from an associated towing vehicle. The embodiments as shown and described herein are relatively uncomplicated in design, may be easily retrofitted to existing suspension arrangements, are capable of a long operating life, and are particularly well adapted for the proposed and intended uses In the foregoing description, it will be readily appreciated by those skilled in the art that modifications may be made to the embodiments as disclosed herein without departing from the concepts is associated therewith. Such modifications are to be considered as included in the following claims, unless these claims by the language expressly state otherwise.

The invention claimed is:

1. A vehicle suspension arrangement, comprising:
a mounting member configured to mount to a vehicle frame assembly;
a trailing arm having a first end pivotably coupled to the mounting member and a second end;
an axle assembly coupled to the second end of the trailing arm such that the second end of the trailing arm travels in a vertical direction between a raised position and a lowered position as the axle assembly moves in a vertical direction;
an air spring arrangement biasing the second end of the trailing arm from the vehicle frame assembly; and
a charging arrangement having a first portion operably coupled with the second end of the trailing arm such the first portion is fixed for vertical movement with the second end of the trailing arm, and a second portion that is operably coupled with the vehicle frame assembly such that the second portion is fixed for vertical movement with the vehicle frame assembly, wherein the charging arrangement is configured to generate an electrical charge when the first portion of the charging arrangement moves relative to the second portion of the charging arrangement.

2. The vehicle suspension arrangement of claim 1, wherein the first portion of the charging arrangement includes one of a magnet and a wire coil, and the second portion of the charging arrangement includes the other of the magnet and the wire coil.

3. The vehicle suspension arrangement of claim 2, wherein the magnet is one of a plurality of magnets.

4. The vehicle suspension arrangement of claim 3, wherein the coil is one of a plurality of coils.

5. The vehicle suspension arrangement of claim 2, wherein the coil is one of a plurality of coils.

6. The vehicle suspension arrangement of claim 2, wherein the charging arrangement includes a tube member, and wherein wire coil is wrapped about the tube member.

7. The vehicle suspension arrangement of claim 6, wherein tube member includes a longitudinally extending bore, and wherein the magnet is positioned within the bore.

8. The vehicle suspension arrangement of claim 1, wherein the first portion of the charging arrangement is fixedly coupled to the second end of the trailing arm.

9. The vehicle suspension arrangement of claim 1, further comprising:
an electrical storage arrangement electrically coupled to the charging arrangement and configured to store electrical energy generated by the charging arrangement.

10. The vehicle suspension arrangement of claim 9, wherein the electrical storage arrangement includes a capacitor.

11. The vehicle suspension arrangement of claim 1, further comprising:
a sensor arrangement configured to sense at least one vehicle parameter.

12. The vehicle suspension arrangement of claim 11, wherein the at least one vehicle parameter includes vehicle location.

13. A heavy-duty, commercial trailer assembly, comprising:
the vehicle suspension arrangement of claim 1; and
a trailer body configured to be support by the vehicle frame assembly.

14. A vehicle suspension arrangement, comprising:
a vehicle frame assembly;
an axle assembly operably coupled to the vehicle frame assembly and moveable in a vertical direction between a lowered position and a raised position;
operably coupled with the vehicle frame assembly such the first portion is fixed for vertical movement with the vehicle frame assembly, and a second portion including the other of the magnet and the wire coil such that the second portion is fixed for vertical movement with the axle assembly, wherein the charging arrangement is configured to generate an electrical charge as the magnet moves with respect to the wire coil; and
a sensor arrangement configured to receive the electrical charge from the charging arrangement and configured to sense at least one vehicle parameter.

15. The vehicle suspension arrangement of claim 14, wherein the magnet is one of a plurality of magnets.

16. The vehicle suspension arrangement of claim 15, wherein the coil is one of a plurality of coils.

17. The vehicle suspension arrangement of claim 14, wherein the coil is one of a plurality of coils.

18. The vehicle suspension arrangement of claim 14, wherein the charging arrangement includes a tube member, and wherein wire coil is wrapped about the tube member.

19. The vehicle suspension arrangement of claim 18, wherein tube member includes a longitudinally extending bore, and wherein the magnet is positioned within the bore.

20. The vehicle suspension arrangement of claim 14, further comprising:
a electrical storage arrangement electrically coupled to the charging arrangement and configured to store electrical energy generated by the charging arrangement.

21. The vehicle suspension arrangement of claim 20, wherein the electrical storage arrangement includes a capacitor.

22. The vehicle suspension arrangement of claim 14, wherein the at least one vehicle parameter includes vehicle location.

23. A heavy duty, commercial trailer assembly, comprising:
the vehicle suspension arrangement of claim 14; and
a trailer body configured to be support by the vehicle frame assembly.

* * * * *

UNITED STATES PATENT AND TRADEMARK OFFICE
CERTIFICATE OF CORRECTION

PATENT NO. : 10,889,186 B2
APPLICATION NO. : 16/246053
DATED : January 12, 2021
INVENTOR(S) : Schutt It is certified that error appears in the above-identified patent and that said Letters Patent is hereby corrected as shown below:

On the Title Page

Item (57) Abstract, Line 7:
After "such" insert -- that --

In the Specification

Column 1, Line 5:
"APPLICATIONS" should be -- APPLICATION --

Column 1, Line 25:
After "includes" insert -- a --

Column 1, Line 26:
After "assembly," insert -- a --

Column 1, Line 36:
After "such" insert -- that --

Column 1, Line 51:
After "such" insert -- that --

Column 3, Line 7:
"34" should be -- 42 --

Column 3, Line 21:
"36" should be -- 48 --

Column 4, Line 25:
After "uses" insert -- . --

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,889,186 B2

Column 4, Line 29 Delete "is"

In the Claims

Column 4, Claim 1, Line 47:
After "such" insert -- that --

Column 5, Claim 6, Line 3:
After "wherein" insert -- the --

Column 5, Claim 7, Line 5:
After "wherein" insert -- the --

Column 5, Claim 13, Line 28:
"support" should be -- supported --

Column 5, Claim 14, Line 35:
After "such" insert -- that --

Column 6, Claim 18, Line 17:
After "wherein" insert -- the --

Column 6, Claim 19, Line 19:
After "wherein" insert -- the --

Column 6, Claim 20, Line 23:
"a" should be -- an --

Column 6, Claim 23, Line 35:
"support" should be -- supported --